United States Patent
Koeneman et al.

(10) Patent No.: US 9,347,142 B1
(45) Date of Patent: May 24, 2016

(54) FEEDBACK CIRCUIT FOR A HYDROGEN GENERATION SYSTEM

(71) Applicants: Robert L. Koeneman, Cape Canaveral, FL (US); Traver H. Kennedy, Miami, FL (US)

(72) Inventors: Robert L. Koeneman, Cape Canaveral, FL (US); Traver H. Kennedy, Miami, FL (US)

(73) Assignee: JOI Scientific, Inc., Merritt Island, FL (US)

( * ) Notice: Subject to any disclaimer, the term of this patent is extended or adjusted under 35 U.S.C. 154(b) by 0 days.

(21) Appl. No.: 14/852,732

(22) Filed: Sep. 14, 2015

Related U.S. Application Data

(63) Continuation-in-part of application No. 14/616,851, filed on Feb. 9, 2015, now abandoned.

(60) Provisional application No. 62/091,702, filed on Dec. 15, 2014.

(51) Int. Cl.
| | |
|---|---|
| *C25B 15/02* | (2006.01) |
| *C25B 1/04* | (2006.01) |
| *C25B 9/06* | (2006.01) |
| *C25B 9/04* | (2006.01) |

(52) U.S. Cl.
CPC . *C25B 15/02* (2013.01); *C25B 1/04* (2013.01); *C25B 9/04* (2013.01); *C25B 9/06* (2013.01)

(58) Field of Classification Search
CPC .............. C25B 1/04; C25B 9/06; C25B 15/02
See application file for complete search history.

(56) References Cited

U.S. PATENT DOCUMENTS

| 4,424,105 | A | 1/1984 | Hanson | |
|---|---|---|---|---|
| 4,795,537 | A * | 1/1989 | Timewell | C25B 1/04 204/229.5 |
| 4,936,961 | A | 6/1990 | Meyer | |
| 6,332,434 | B1 * | 12/2001 | De Souza | C25B 9/06 123/3 |
| 2006/0060464 | A1 | 3/2006 | Chang | |
| 2007/0216165 | A1 * | 9/2007 | Oohara | C25B 15/02 290/44 |
| 2007/0272546 | A1 | 11/2007 | Matthews | |
| 2008/0277273 | A1 * | 11/2008 | Logan | C02F 3/005 204/253 |
| 2008/0302670 | A1 | 12/2008 | Boyle | |
| 2011/0259757 | A1 | 10/2011 | Vancina | |

(Continued)

FOREIGN PATENT DOCUMENTS

| DE | 2713533 | 9/1978 |
|---|---|---|
| WO | 2004097072 A1 | 11/2004 |

(Continued)

OTHER PUBLICATIONS

International Search Report (ISR)—PCT/US2015/065854—Mar. 10, 2016—6 pages (including notification of transmittal of the ISR and WO of the ISA).

(Continued)

*Primary Examiner* — Nicholas A Smith
(74) *Attorney, Agent, or Firm* — Krishna Kalidindi

(57) ABSTRACT

A hydrogen generation system includes a signal generation system configured to generate a driver signal. A signal processing system is configured to process the driver signal and generate a chamber excitation signal. A hydrogen generation chamber is configured to receive the chamber excitation signal and generate hydrogen from a feedstock contained within the hydrogen generation chamber. The signal processing system includes a feedback circuit that is configured to couple a cathode of the hydrogen generation chamber to an anode of the hydrogen generation chamber.

8 Claims, 6 Drawing Sheets

(56) References Cited

U.S. PATENT DOCUMENTS

| | | |
|---|---|---|
| 2012/0058405 A1 | 3/2012 | Kirchoff |
| 2012/0152197 A1 | 6/2012 | Innskeep |
| 2012/0222954 A1 | 9/2012 | Lothring |
| 2013/0118908 A1 | 5/2013 | Radu |
| 2014/0363806 A1 | 12/2014 | Fillipone |

FOREIGN PATENT DOCUMENTS

| | | |
|---|---|---|
| WO | 2010024965 A1 | 3/2010 |
| WO | 2014028951 A1 | 2/2014 |
| WO | 2014064470 A1 | 5/2014 |

OTHER PUBLICATIONS

Written Opinion (WO) of International Search Authority (ISA)—PCT/US2015/065854—Mar. 10, 2016—7 pages.

International Search Report (ISR)—PCT/US2015/065785—Mar. 4, 2016—6 pages (including notification of transmittal of the ISR and WO of the ISA).

Written Opinion (WO) of International Search Authority (ISA)—PCT/US2015/065785—Mar. 4, 2016—8 pages.

http://web.archive.org/web/20130130100756/https://en.wikipedia.org/wiki/Band-stop_filter—Jan. 20, 2013.

* cited by examiner

FEEDBACK CIRCUIT FOR A HYDROGEN GENERATION SYSTEM

RELATED APPLICATION(S)

This application claims the benefit of U.S. Provisional Patent Application No. 62/091,702, entitled "Polyphonic Methods and Related Apparatus and Arrangements" and filed on 15 Dec. 2014, the entire contents of which is herein incorporated by reference.

This application is a Continuation-in-Part (CIP) of U.S. Utility patent application Ser. No. 14/616,851, entitled "Energy Extraction System and Methods" and filed on 9 Feb. 2015, the entire contents of which are herein incorporated by reference.

TECHNICAL FIELD

This disclosure relates to hydrogen generation systems and, more particularly, to hydrogen generation systems that use hydrolysis to generate hydrogen from feedstock.

BACKGROUND

Currently, the majority of the energy consumed by the developed world has its origins in fossil fuels. Unfortunately, there are many well-documented problems associated with over-reliance upon energy generated from fossil fuels, such as: pollution and climate change caused by the emission of greenhouse gases: the finite nature of fossil fuels and the dwindling reserves of such carbon-based energy sources; and the concentration of control of petroleum-based energy supplies by various volatile countries and OPEC.

Accordingly, there is a need for alternative sources of energy. One such alternative energy source includes hydrogen generation systems that produce hydrogen via hydrolysis. Ideally, such hydrogen generation systems would be capable of producing hydrogen gas without the presence of oxygen, wherein such hydrogen may be used for industrial, commercial and residential purposes.

For example, when greater than 99% pure, hydrogen may be used in generator cooling, steel production, glass production, and semiconductor and photovoltaic cell production. When less than 99% pure, hydrogen may be used in various industries, such as the aerospace industry, the animal feed industry, the automotive industry, the baking industry, the chemical industry, the ethanol industry, the food processing industry, the dairy industry, the meat industry, the manufacturing industry, the medical industry, the hospitality industry, the laundry/uniform industry, the marine and offshore industry, the military and defense industry, the mining industry, the oil and gas industry, the paper/corrugating industry, the pharmaceutical industry, the rubber industry, the steel and metals industry, the tobacco industry, the transportation industry, the wire and cable industry, and the education industry.

Unfortunately, there are a number of significant hurdles that prevent the widespread use of hydrogen in commercial, industrial, and residential applications. These hurdles include cost, efficiency, and safety. First and foremost, creating hydrogen gas in a traditional manner is inefficient and costly, or even environmentally harmful when produced via reformation (i.e., the primary commercial method). Secondly, hydrogen's very low mass and energy density makes it challenging to get enough mass of hydrogen gas safely in one place to be of practical value to a user. The result is that hydrogen has been prohibitively expensive to produce, compress, cryogenically cool, maintain (at pressure and temperature), contain (due to its very small molecule structure), and transport. Accordingly, pressure, temperature, flammability, explosiveness, and low ignition energy requirement are all significant safety issues concerning the widespread use of hydrogen.

Summary of Disclosure

In one implementation, a hydrogen generation system includes a signal generation system configured to generate a driver signal. A signal processing system is configured to process the driver signal and generate a chamber excitation signal. A hydrogen generation chamber is configured to receive the chamber excitation signal and generate hydrogen from a feedstock contained within the hydrogen generation chamber. The signal processing system includes a feedback circuit that is configured to couple a cathode of the hydrogen generation chamber to an anode of the hydrogen generation chamber.

One or more of the following features may be included. The feedback circuit may include a capacitive component. The capacitive component may be sized based, at least in part, upon one or more physical characteristics of the hydrogen generation chamber. The capacitive component may be sized based, at least in part, upon one or more physical characteristics of the feedstock contained within the hydrogen generation chamber. The capacitive component may include two discrete capacitors. A first of the discrete capacitors may be coupled to the anode of the hydrogen generation chamber. A second of the discrete capacitors may be coupled to the cathode of the hydrogen generation chamber. The feedback circuit may include an asymmetrically conductive component. The asymmetrically conductive component may be positioned between the two discrete capacitors. The asymmetrically conductive component may be a diode. The diode may be a light emitting diode.

In another implementation, a hydrogen generation system includes a signal generation system configured to generate a driver signal. A signal processing system is configured to process the driver signal and generate a chamber excitation signal. A hydrogen generation chamber is configured to receive the chamber excitation signal and generate hydrogen from a feedstock contained within the hydrogen generation chamber. The signal processing system includes a feedback circuit that is configured to couple a cathode of the hydrogen generation chamber to an anode of the hydrogen generation chamber.

One or more of the following features may be included. The feedback circuit may include a capacitive component. The capacitive component may include two discrete capacitors. A first of the discrete capacitors may be coupled to the anode of the hydrogen generation chamber. A second of the discrete capacitors may be coupled to the cathode of the hydrogen generation chamber. The feedback circuit may include an asymmetrically conductive component. The asymmetrically conductive component may be positioned between the two discrete capacitors.

In another implementation, a hydrogen generation system includes a signal generation system configured to generate a driver signal. A signal processing system is configured to process the driver signal and generate a chamber excitation signal. A hydrogen generation chamber is configured to receive the chamber excitation signal and generate hydrogen from a feedstock contained within the hydrogen generation chamber. The signal processing system includes a feedback circuit that is configured to couple a cathode of the hydrogen generation chamber to an anode of the hydrogen generation chamber, the feedback circuit including a capacitive component that is sized based, at least in part, upon one or more of: the physical characteristics of the hydrogen generation chamber, and the physical characteristics of the feedstock contained within the hydrogen generation chamber.

One or more of the following features may be included. The feedback circuit may include an asymmetrically conductive component.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION OF THE PREFERRED EMBODIMENTS

Figure 1:
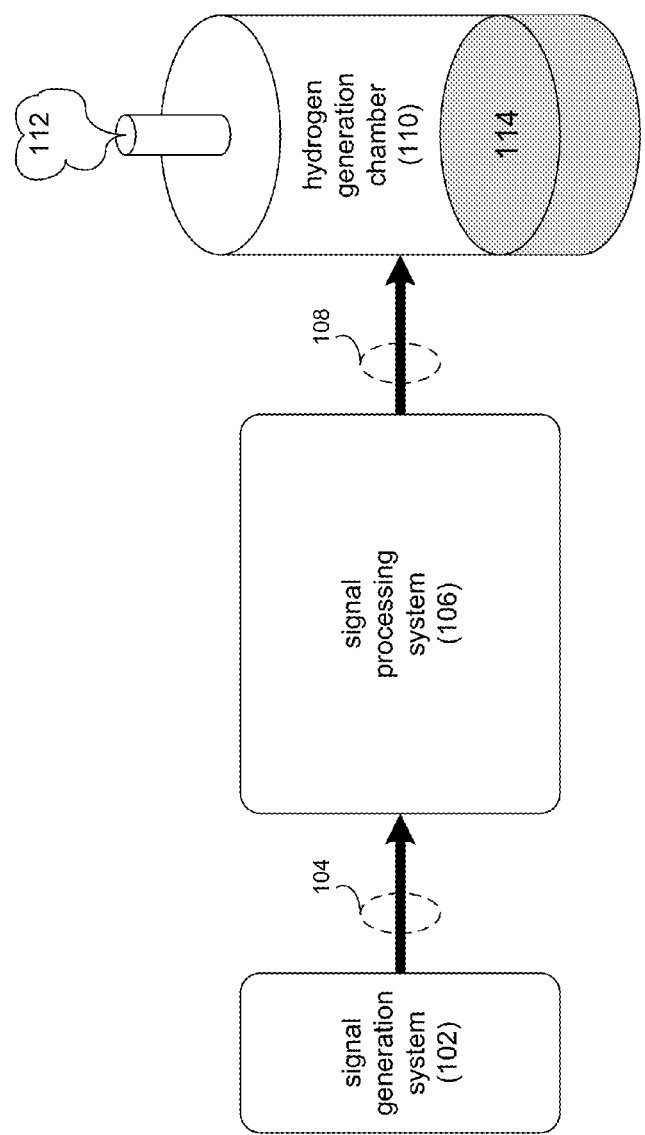
FIG. 1 is a diagrammatic view of a hydrogen generation system.

Hydrogen Generation System Overview:

Referring to FIG. 1, there is shown hydrogenation generation system 100. Hydrogen generation system 100 may include signal generation system 102 configured to generate a driver signal 104. An example of driver signal 104 may include but is not limited to a pulsed DC signal. Driver signal 104 may be provided to signal processing system 106, wherein signal processing system 106 may be configured to process driver signal 104 and generate a chamber excitation signal 108.

Hydrogen generation system 100 may include hydrogen generation chamber 110 that may be configured to receive chamber excitation signal 108 and generate hydrogen 112 (e.g., gaseous hydrogen) from feedstock 114 contained within hydrogen generation chamber 110.

As discussed above, hydrogen 112 produced by hydrogen generation system 100 may be used with various industries, such as the aerospace industry, the animal feed industry, the automotive industry, the baking industry, the chemical industry, the ethanol industry, the food processing industry, the dairy industry, the meat industry, the manufacturing industry, the medical industry, the hospitality industry, the laundry/uniform industry, the marine and offshore industry, the military, the mining industry, the oil and gas industry, the paper/corrugating industry, the pharmaceutical industry, the rubber industry, the steel and metals industry, the tobacco industry, the transportation industry, the wire and cable industry, and the education industry.

As discussed above, hydrogen generation system 100 may generate hydrogen 112 (e.g., gaseous hydrogen) from feedstock 114 contained within hydrogen generation chamber 110. One example of feedstock 114 may include but is not limited to sea water. Accordingly and in certain implementations, hydrogen generation system 100 may be positioned proximate a source of feedstock 114. Alternatively, feedstock 114 may be provided to hydrogen generation system 100 via a delivery network, not shown.

Hydrogen generation chamber 110, when filled with an electrolytic fluid (e.g., feedstock 114), may react like a variable capacitive load with corresponding variable impedance values. When a Pulsed DC signal (e.g., chamber excitation signal 108) is applied to hydrogen generation chamber 110, the result may be a reactive load. Hydrogen generation chamber 110 may complete the closed circuit path that forms the load factor during the ON Cycle Pulse (OCP) of chamber excitation signal 108.

The electrolytic fluid (e.g., feedstock 114) may change state both chemically and electronically during the OCP of chamber excitation signal 108. These changes may affect the charge state of feedstock 114, changing the above-described capacitive and impedance values, which may be monitored via a differential potential voltage measurement across the anode and cathode of hydrogen generation chamber 110.

Signal processing system 106 may provide impedance matching and capacitive balancing during the OCP of chamber excitation signal 108. Balancing of signal processing system 106 may accomplish multiple functions, including but not limited to lowering reactive circuit current demand while directing chamber excitation signal 108 with a given base frequency across the electrodes of hydrogen generation chamber 110.

During the OFF Cycle Pulse (OFCP) of chamber excitation signal 108, the inductive and capacitive sections of signal processing system 106 may receive energy from hydrogen generation chamber 110 as hydrogen generation chamber 110 discharges.

Figure 2:
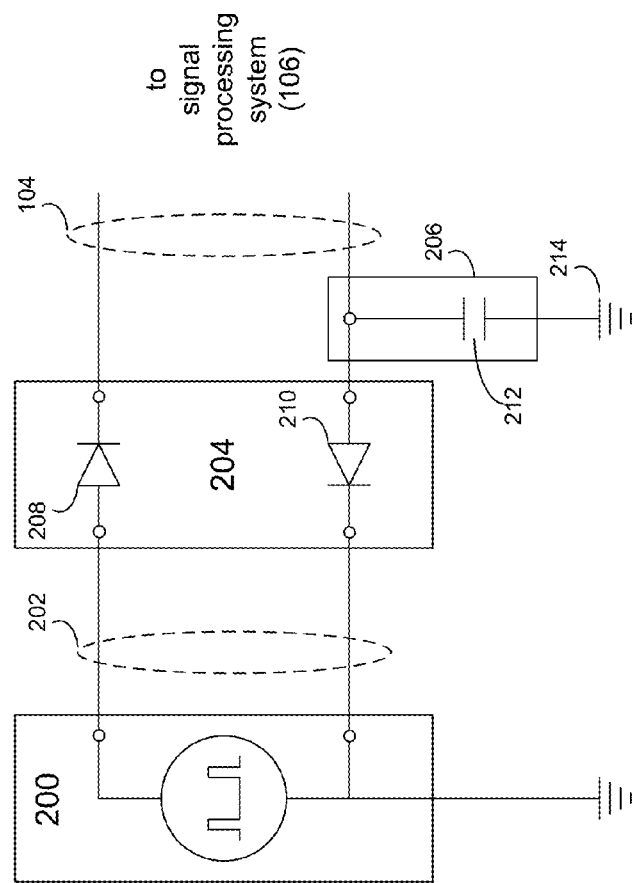
FIG. 2 is a diagrammatic view of a signal generation system included within the hydrogen generation system of FIG. 1.

Signal Generation System Configuration:

Referring to FIG. 2, there is shown one implementation of signal generation system 102. Signal generation system 102 may include pulsed DC source 200 configured to generate pulsed DC source signal 202. Signal generation system 102 may include mono-directional blocking circuit 204 configured to receive pulsed DC source signal 202 and generate driver signal 104. Signal generation system 102 may also include filter circuit 206 configured to filter driver signal 104 and remove AC components.

Mono-directional blocking circuit 204 may include at least one asymmetrically conductive component, an example of which includes but is not limited to a diode (e.g., a Schottky diode), such as a 1N4003G diode available from ON Semiconductor configured to function as blocking diodes. In a typical configuration, mono-directional blocking circuit 204 may include two asymmetrically conductive components 208, 210. Filter circuit 206 may include capacitor 212 coupled to ground 214 that is sized to remove any undesirable AC signal components. An example of capacitor 212 may include a 470 microfarad capacitor available from Mouser Electronics.

One implementation of driver signal 104 generated by signal generation system 102 may be a driver signal that has a duty cycle of less than 25%. Specifically and in a preferred embodiment, driver signal 104 may have a duty cycle between 6.5% and 13%, wherein during 6.5%-13% of the waveform of driver signal 104, driver signal 104 has an amplitude of 4.5 to 10 VDC and during 87%-93.5% of the waveform of driver signal 104, driver signal 104 has an amplitude of 0 VDC. The above-described implementations of driver signal 104 are intended to be illustrative and not all inclusive.

Accordingly, these are intended to be merely examples of the various driver signals that be utilized by signal generation system 102.

Operation of the Signal Generation System

Concerning driver signal 104 generated by signal generation system 102, the rise time of driver signal 104 may be critical to the overall function and performance of hydrogen generation chamber 110. Accordingly, a rise time as close to instantaneous as possible (e.g., as close to a truly vertical sweep) may result in the most efficient operation of hydrogen generation chamber 110. Further, the amplitude of driver signal 104 may be increased/decreased to vary the performance of hydrogen generation chamber 110 and the quantity of hydrogen 112 produced.

Signal generation system 102 may be configured to provide for adjustments in the pulse width and/or duty cycle of driver signal 104. Any pulse width and/or duty cycle adjustments may be based on the desired chamber performance. The timing of the duty cycle of driver signal 104 may establish a base frequency for driver signal 104. In a preferred embodiment, the pulse base frequency of driver signal 104 may range from 100 hertz to 10 kilohertz (however, frequencies outside of this range may also be utilized).

The diodes (e.g., asymmetrically conductive components 208, 210) utilized in mono-directional blocking circuit 204 may perform several functions. Typically, Schottky diodes have forward biases of approximately 1 mA in the range 0.15 to 0.46 volts. This lower forward voltage may provide for higher switching speeds and better system efficiency, wherein Schottky diodes are considered to have essentially instant reverse recovery time.

The two diodes (e.g., asymmetrically conductive components 208, 210) may provide a first stage voltage clamp that may enhance rise time and forward current build up, which may be important during each startup of the OCP. The blocking diodes (e.g., asymmetrically conductive components 208, 210) may provide transient voltage suppression during initial charging of hydrogen generation chamber 110. This may allow hydrogen generation chamber 110 to reach full voltage amplitude in the least amount time.

The two diodes (e.g., asymmetrically conductive components 208, 210) may also prevent voltage returned from hydrogen generation chamber 110 from interfering with pulsed DC source signal 202, thus isolating the downstream circuit (e.g., signal processing system 106) during the off cycle while the reactive part of this circuit is in the recovery phase and exposed to a return voltage in the range of 0.90 VDC to 4.5 VDC.

Figure 3:
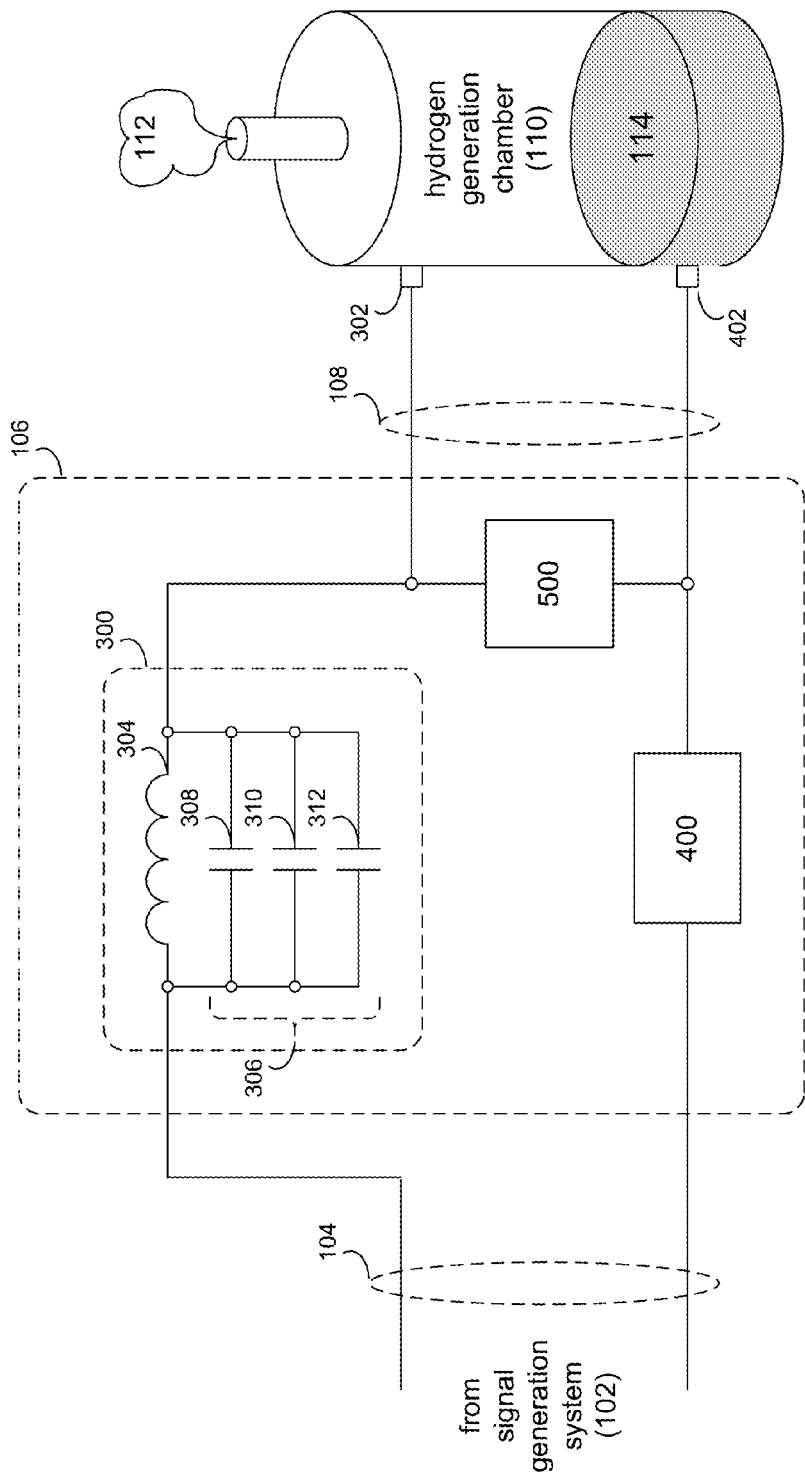
FIG. 3 is a diagrammatic view of a positive reactive circuit included within the hydrogen generation system of FIG. 1.

Positive Reactive Circuit Configuration:

Referring to FIG. 3, there is shown one implementation of signal processing system 106, wherein signal processing system 106 is shown to include positive reactive circuit 300. Positive reactive circuit 300 may be coupled to anode 302 of hydrogen generation chamber 110.

In one implementation, positive reactive circuit 300 may include inductive component 304 and capacitive component 306. One example of inductive component 304 may include a 10 microhenry inductor available from Mouser Electronics. Inductive component 304 may be in parallel with capacitive component 306. Capacitive component 306 may be sized based, at least in part, upon one or more physical characteristics of hydrogen generation chamber 110 (e.g., size, shape, electrode type, configuration and dimensions) and/or one or more physical characteristics of feedstock 114 (e.g., feedstock type and contents included therein) contained within hydrogen generation chamber 110.

Inductive component 304 may be constructed of/formed from several individual inductors that may be arranged (in a parallel and/or series configuration) to achieve the desired inductance value. Additionally (and as will be discussed below), capacitive component 306 may be constructed of/formed from several individual capacitors that are arranged (in a parallel and/or series configuration) to achieve the desired capacitive value.

In one implementation, capacitive component 306 may include a plurality of discrete capacitors. For example, capacitive component 306 may include three discrete capacitors (e.g., capacitors 308, 310, 312) arranged in parallel to form a parallel capacitor circuit. In one particular implementation, capacitor 308 may be a 45 microfarad capacitor available from Mouser Electronics, capacitor 310 may be a 1 picofarad capacitor available from Mouser Electronics, and capacitor 312 may be a 5 nanofarads capacitor available from Mouser Electronics. This parallel capacitor circuit (e.g., the parallel combination of capacitors 308, 310, 312) may be coupled in parallel with inductive component 304, wherein the output of the parallel capacitor circuit (e.g., the parallel combination of capacitors 308, 310, 312) and inductive component 304 may be provided to anode 302 of hydrogen generation chamber 110.

In this particular implementation, positive reactive circuit 300 may be configured as a band-stop filter. As is known in the art and in signal processing, a band-stop filter (or band-rejection filter) is a filter that passes most frequencies unaltered (i.e., unattenuated), while attenuating those frequencies that are within a defined range. As with any other LC filter, the particular range of frequencies that are attenuated may be defined based upon the value of the capacitors (e.g., capacitors 308, 310, 312) and inductors (e.g., inductive component 304) included within positive reactive circuit 300.

Figure 4:
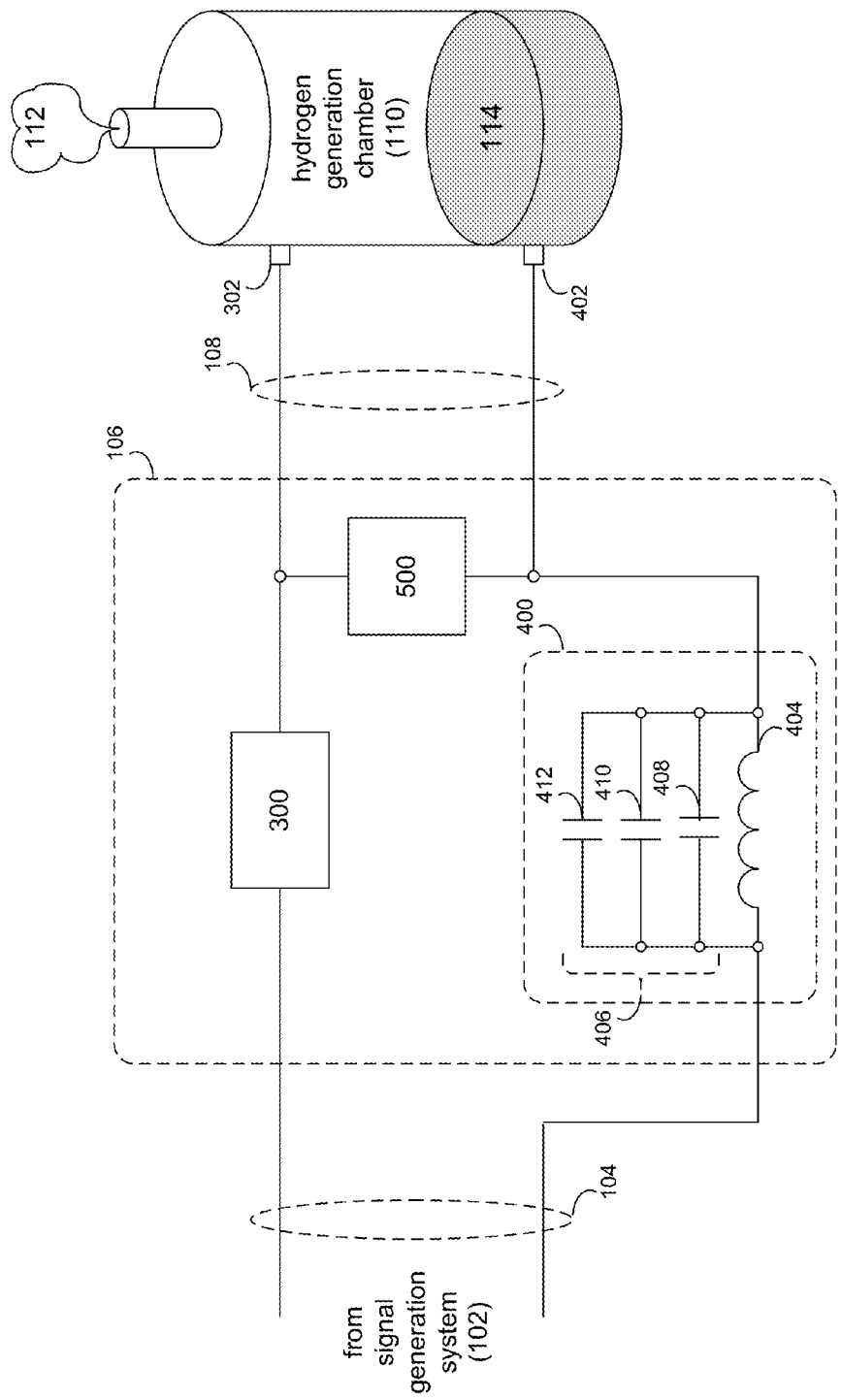
FIG. 4 is a diagrammatic view of a negative reactive circuit included within the hydrogen generation system of FIG. 1.

Negative Reactive Circuit Configuration:

Referring to FIG. 4, there is shown one implementation of signal processing system 106, wherein signal processing system 106 is shown to include negative reactive circuit 400. Negative reactive circuit 400 may be coupled to cathode 402 of hydrogen generation chamber 110.

In one implementation, negative reactive circuit 400 may include inductive component 404 and capacitive component 406. One example of inductive component 404 may include a 100 microhenry inductor available from Mouser Electronics. Inductive component 404 may be in parallel with capacitive component 406. Capacitive component 406 may be sized based, at least in part, upon one or more physical characteristics of hydrogen generation chamber 110 (e.g., size, shape, electrode type, configuration and dimensions) and/or one or more physical characteristics of feedstock 114 (e.g., feedstock type and contents included therein) contained within hydrogen generation chamber 110.

Inductive component 404 may be constructed of/formed from several individual inductors that may be arranged (in a parallel and/or series configuration) to achieve the desired inductance value. Additionally (and as will be discussed below), capacitive component 406 may be constructed of/formed from several individual capacitors that are arranged (in a parallel and/or series configuration) to achieve the desired capacitive value.

In one implementation, capacitive component 406 may include a plurality of discrete capacitors. For example, capacitive component 406 may include three discrete capacitors (e.g., capacitors 408, 410, 412) arranged in parallel to form a parallel capacitor circuit. In one particular implementation, capacitor 408 may be a 1 microfarad capacitor available from Mouser Electronics, capacitor 410 may be a 1 picofarad capacitor available from Mouser Electronics, and capacitor 412 may be a 5 nanofarads capacitor available from Mouser Electronics. This parallel capacitor circuit (e.g., the parallel combination of capacitors 408, 410, 412) may be coupled in parallel with inductive component 404, wherein the output of the parallel capacitor circuit (e.g., the parallel combination of capacitors 408, 410, 412) and inductive component 304 may be provided to cathode 402 of hydrogen generation chamber 110.

In this particular implementation, negative reactive circuit 400 may be configured as a band-stop filter. As is known in the art and in signal processing, a band-stop filter (or band-rejection filter) is a filter that passes most frequencies unaltered (i.e., unattenuated), while attenuating those frequencies that are within a defined range. As with any other LC filter, the particular range of frequencies that are attenuated may be defined based upon the value of the capacitors (e.g., capacitors 408, 410, 412) and inductors (e.g., inductive component 404) included within negative reactive circuit 400.

Figure 5:
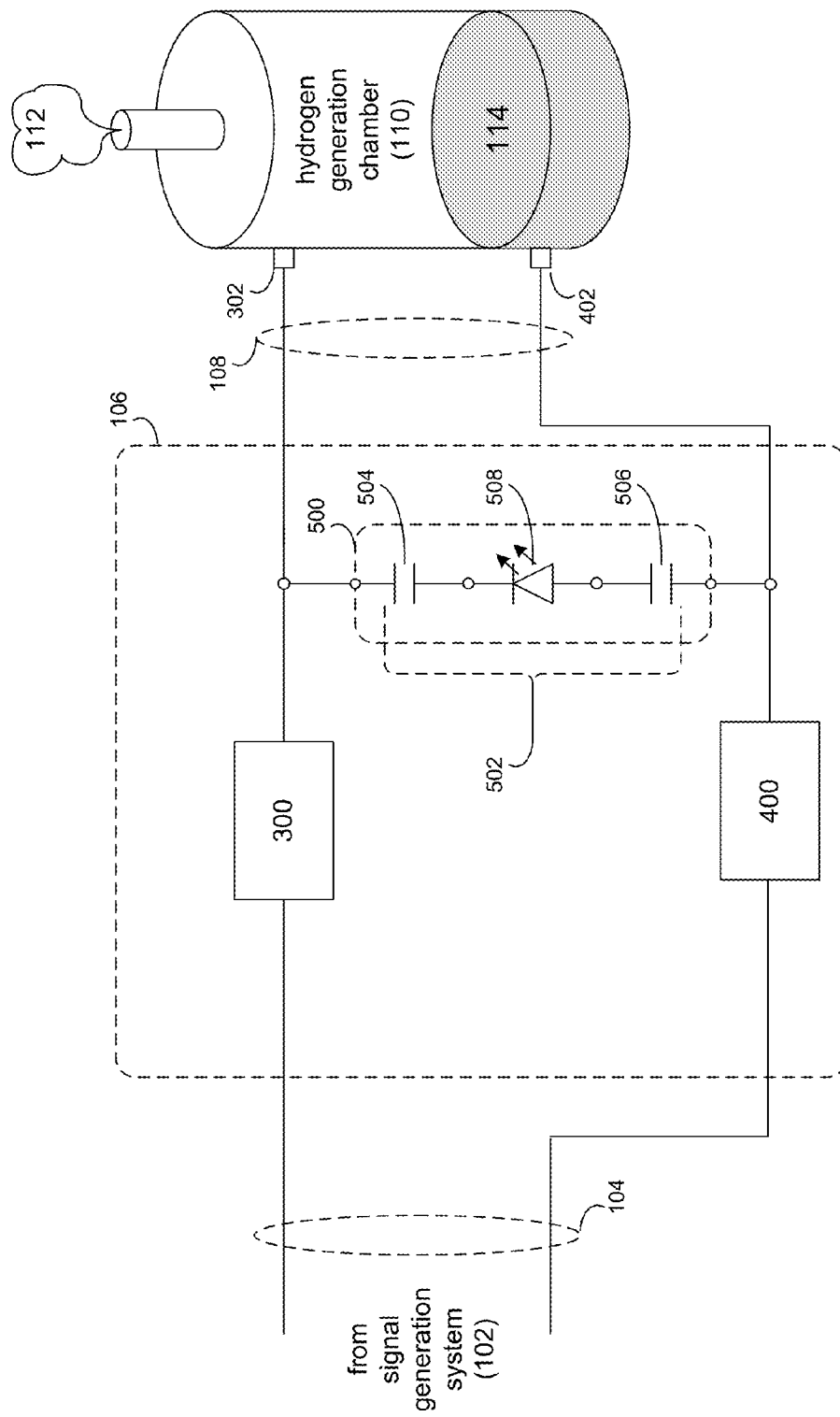
FIG. 5 is a diagrammatic view of a feedback circuit included within the hydrogen generation system of FIG. 1.

Feedback Circuit Configuration:

Referring to FIG. 5, there is shown one implementation of signal processing system 106, wherein signal processing system 106 is shown to include feedback circuit 500. Feedback circuit 500 may be configured to couple anode 302 of hydrogen generation chamber 110 to cathode 402 of hydrogen generation chamber 110.

In one implementation, feedback circuit 500 may include capacitive component 502. Capacitive component 502 may be sized based, at least in part, upon one or more physical characteristics of hydrogen generation chamber 110 (e.g., size, shape, electrode type, configuration and dimensions) and/or one or more physical characteristics of feedstock 114 (e.g., feedstock type and contents included therein) contained within hydrogen generation chamber 110.

Capacitive component 502 may include two discrete capacitors (e.g., capacitors 504, 506). In one particular implementation, capacitor 504 may be a 1 microfarad capacitor available from Mouser Electronics and capacitor 506 may be a 1 microfarad capacitor available from Mouser Electronics, A first of the discrete capacitors (e.g., capacitor 504) may be coupled to anode 302 of hydrogen generation chamber 110. A second of the discrete capacitors (e.g., discrete capacitor 506) may be coupled to cathode 402 of hydrogen generation chamber 110.

Feedback circuit 500 may include asymmetrically conductive component 508, wherein asymmetrically conductive component 508 may be positioned between the two discrete capacitors (e.g., capacitors 504, 506). One example of asymmetrically conductive component 508 may include but is not limited to a diode (e.g., a light emitting diode), such as a RED/diffused T-1 (3 mm) 696-SSL-LX3044ID_available from Mouser Electronics.

Operation of the Signal Processing System:

Concerning the reactive circuits (e.g., positive reactive circuit 300 and negative reactive circuit 400), these circuits may incorporate an inductor in parallel with plurality of capacitors (as discussed above). Upon the initiation of the OCP, these inductors may oppose any rise in current. This opposition may be part of the electronic clamp during the rise time of the OCP. The capacitors in parallel with the inductor may start to charge during the rise time of the OCP and provide a path for electron flow in the direction of hydrogen generation chamber 110.

These capacitors may not be able to overcome the voltage amplitude of hydrogen generation chamber 110 and, therefore, may not be able to discharge during the OCP time. As these capacitors may be relatively small and may reach full charge status during the rise time of OCP and may remain charged during the duration of the OCP.

The slight opposition to current change (by the inductor) during the OCP rise time may quickly dissipate, wherein the inductor opposes current change based upon magnetically induced resistance to the current flow.

Hydrogen generation chamber 110 may function as a load for signal processing system 106, wherein hydrogen generation chamber 110 may have a varying internal resistance and a varying voltage amplitude. Hydrogen generation chamber 110 may behave similarly to an inductive/capacitive electronic component, wherein variations may occur based upon varying electrolytic conditions that can vary dramatically during the rise time of the OCP. These varying conditions may continue during the length of the duty cycle and may be in the form of a charge ion state triggering charging of hydrogen generation chamber 110. The electron density within hydrogen generation chamber 110 may increase dramatically within hydrogen generation chamber 110. This electron density may be at its greatest at a circumference slightly larger than the outer diameter of cathode 402.

The ON cycle rise time and duration of the duty cycle may cause a molecular polarity shift within the electrolytic fluid (e.g., feedstock 114). This molecular polarity shift may have a corresponding electromagnetic/electrostatic component. Due to the shape and geometry of hydrogen generation chamber 110 and without a defined electron flow pathway, the electromagnetic component will have a chaotic characteristic, wherein this chaotic characteristic may assist in the molecular splitting of gas atoms from the water molecules within the electrolytic fluid (e.g., feedstock 114) due to a constant molecular charge imbalance.

The OFF cycle of signal processing system 106 may start at the beginning of the OFCP. The blocking diodes (e.g., asymmetrically conductive components 208, 210) are in the cutoff state which may isolate signal generation system 102 from signal processing system 106. A pulsed DC input base signal set to one kilohertz may reach the cutoff state one-thousand times per second. During the OFF cycle, the electrolytic fluid (e.g., feedstock 114) in hydrogen generation chamber 110 may change from a charge state to a reset discharge cycle. During this OFF cycle, all electronic interactions may be energized from energy recovered (or harvested) from hydrogen generation chamber 110.

The charge amplitude of hydrogen generation chamber 110 may have a characteristic fast decline from greater than 3.5 VDC to less than 1.4 VDC. The decline curve sweep angle may be dependent on the pulsed DC input frequency and the configuration of the reaction circuits (e.g., positive reaction circuit 300 and negative reaction circuit 400).

During the cutoff initiation, the first decline sequence to occur is the collapse of the electron density column surrounding cathode 402. This high density electron column may be held in place by the induced magnetic field that is a result of the OCP. This collapse may cause an electronic flashback (or rapid energy release) from hydrogen generation chamber 110 to the reactive circuit (e.g., positive reaction circuit 300 and/or negative reaction circuit 400), which is similar to an electrostatic discharge and may provide the electrolytic fluid (e.g., feedstock 114) with a pathway to start a change in state of polarity releasing additional stored energy.

Once the electron column proximate cathode 402 starts to collapse, there is a fast rise in potential on negative reactive circuit 402. At this point, there may be an imbalance with positive reactive circuit 302. The inductor within negative reactive circuit 402 may have a rise in potential imposing an impedance value that may allow the parallel capacitors to discharge in the opposite direction to the charge state during the OCP. This situation may create a latching circuit potential through hydrogen generation chamber 110 as the pathway for electron flow.

The return energy from hydrogen generation chamber 110 may be a DC signal with embedded AC components, wherein these AC components may be relatively small in amplitude. The AC components may be driven by the molecular polarity shift after the cutoff sequence is initiated and the imbalance of the charge state of hydrogen generation chamber 110. The DC component produced by hydrogen generation chamber 110 may be clamped to swing the AC wave into the positive range.

The capacitors in the reactive circuits (e.g., positive reaction circuit 300 and/or negative reaction circuit 400) may charge stabilize after the electrostatic release from the DC component. The inductors may provide timing sequences and preload for capacitor charge/discharge sequence while minimizing circuit resistance at peak input values. The capacitors may subsequently discharge under the influence of the AC components. The result may be an amplification of the embedded frequency waves providing a charge/discharge cycle at these given frequencies. This sequence may continue until the molecular polarity rotation of hydrogen generation chamber 110 is stabilized or the charge imbalance of the reactive circuit (e.g., positive reaction circuit 300 and/or negative reaction circuit 400) is diminished.

Feedback circuit 500 may be configured in reverse polarity to signal generation system 102 and signal processing system 106. Feedback circuit 500 may function as a secondary load to the reset reaction of hydrogen generation chamber 110. The capacitors (e.g., capacitors 504, 506) of feedback circuit 500 may collect electrons during the electrostatic discharge cycle, which may then be discharged through the light emitting diode (i.e., asymmetrically conductive component 508).

Feedback circuit 500 may assist in minimizing the electrostatic discharge impact on other portions of the reactive circuit (e.g., positive reaction circuit 300 and/or negative reaction circuit 400), which may result in the regulation of the timing of ON, OFF and Cutoff sequences. The light emitting diode (i.e., asymmetrically conductive component 508) may minimize electrostatic interference, thus assisting in maintaining peak charge amplitudes during the reset sequence of hydrogen generation chamber 110.

Specifically, the electrostatic charge may find a secondary pathway through the light emitting diode (i.e., asymmetrically conductive component 508). The light emitting diode (e.g., asymmetrically conductive component 508) may have a characteristic that allows static electricity to pass through while minimizing resistive load characteristics. This pathway may help regulate the discharge timing sequence while dissipating the accumulated charge on the capacitors (e.g., capacitors 504, 506). The switching or blocking characteristics of the light emitting diode (i.e., asymmetrically conductive component 508) may also minimizes current loss during the OCP.

Due to the reverse polarity of feedback circuit 500, a portion of the recovered energy may be applied to the riding frequency during the cut off discharge sequence to assist in increasing the frequency amplitude. Further, the secondary electrostatic charge release may assist in the percentage of the desired gas output of hydrogen 112. The electrostatic charge energy may only be recoverable during a given time interval, wherein if the time interval is too long, the electrostatic charge may interfere with the proper sequencing of the OCP and OFCP. Accordingly, the values of capacitors 504, 506 may be adjusted to optimize the timing sequence.

Figure 6:
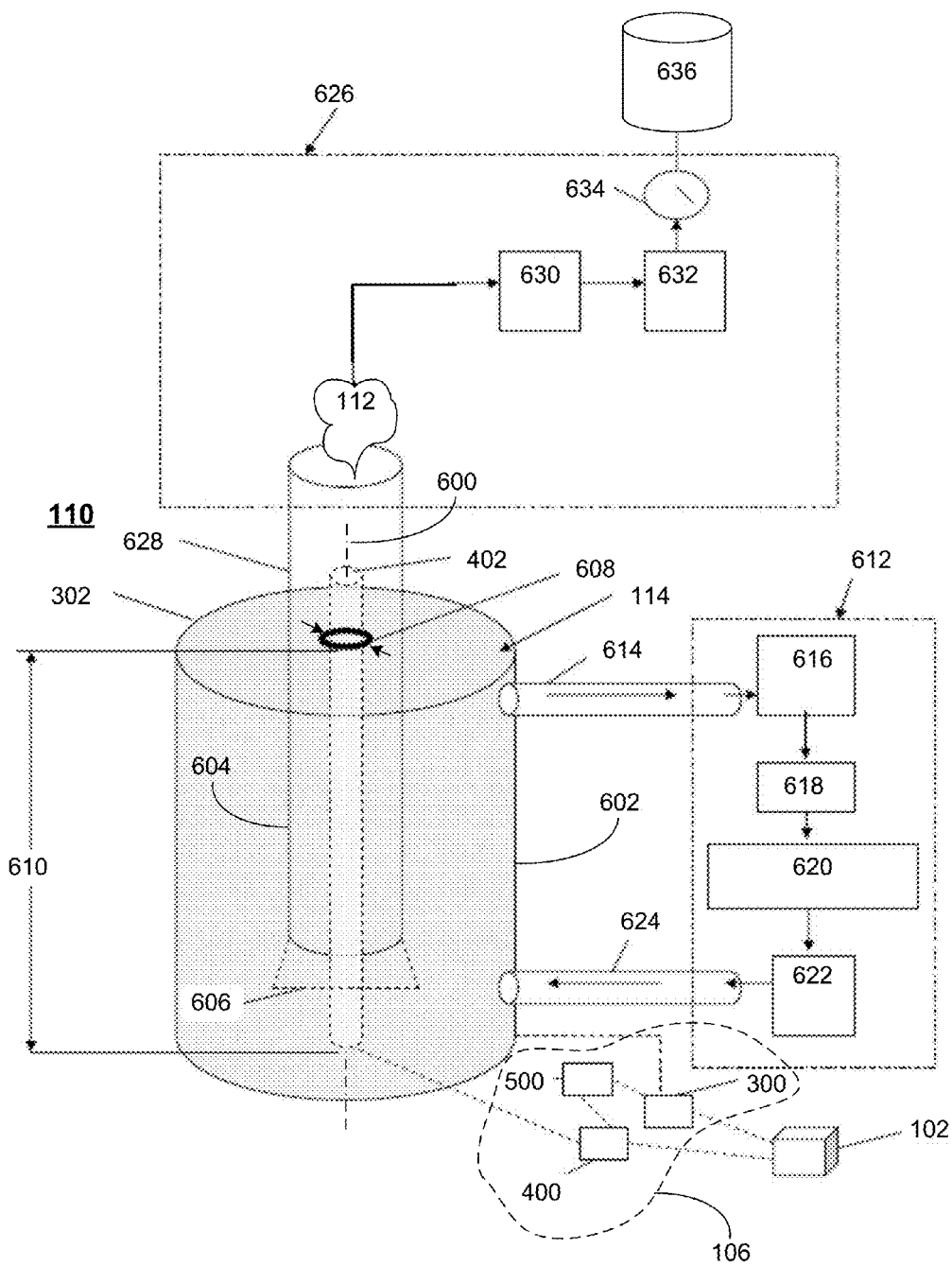
FIG. 6 is a diagrammatic view of a hydrogen generation chamber included within the hydrogen generation system of FIG. 1.

Hydrogen Generation Chamber Configuration:

Referring to FIG. 6, there is shown one implementation of hydrogen generation chamber 110. Hydrogen generation chamber 110 may include at least one hollow cylindrical anode 302 configured to contain feedstock 114. At least one cathode 402 may be positioned within hollow cylindrical anode 302. Cathode 402 may be positioned along a longitudinal centerline (i.e., longitudinal centerline 600) of hollow cylindrical anode 302. Accordingly, hydrogen generation chamber 110 may be configured as a coaxial hydrogen generation chamber, as cathode 402 and hollow cylindrical anode 302 share a common centerline (namely longitudinal centerline 600).

Cathode 402 may be constructed, at least in part, of tungsten. For example, cathode 402 may be a tungsten rod. Hollow cylindrical anode 302 may be constructed, at least in part, of graphite. For example, hollow cylindrical anode 302 may be machined from a block of graphite.

Hollow cylindrical anode 302 may have an outer surface 602 and an inner surface 604, wherein the inside diameter (e.g., inside diameter 606) of hollow cylindrical anode 302 is 2,400% to 2,600% of (i.e., 24-26 times larger than) an outside diameter (e.g., outside diameter 608) of cathode 402 positioned within hollow cylindrical anode 302. For example and in a preferred embodiment, hollow cylindrical anode 302 may have an inside diameter (i.e., inside diameter 606) of 25.0 millimeters and cathode 402 positioned within hollow cylindrical anode 302 may have an outside diameter (e.g., outside diameter 608) of 1.0 millimeter.

Cathode 402 positioned within hollow cylindrical anode 302 may have a longitudinal length (i.e., longitudinal length 610) that is 190% to 210% of (i.e., 1.9-2.1 times longer than) inside diameter 606 of hollow cylindrical anode 302. For example and in a preferred embodiment, cathode 402 positioned within hollow cylindrical anode 302 may have a longitudinal length of 50.0 millimeters (when hollow cylindrical anode 302 has an inside diameter (i.e., inside diameter 606) of 25.0 millimeters.

Hydrogen generation chamber 110 may include feedstock recirculation system 612. For example and in this particular illustrative embodiment, feedstock 114 may be drawn through first conduit 614 and gas contractor 616 and into fuel reservoir 618. Fuel reservoir 618 may serve as a preconditioning zone to maintain feedstock and catalyst concentrations at desired levels. Feedstock 114 may be pulled through circulation pump 620 and then through heat exchanger 622 (to e.g., maintain a desired temperature for feedstock 114) and returned to hydrogen generation chamber 110 via conduit 624.

Gas collection system 626 may be coupled to hydrogen generation chamber 110 and may be configured to collect hydrogen 112 generated by hydrogen generation chamber 110 from feedstock 114. In this particular illustrative example, hydrogen 112 may be drawn through conduit 628 by vacuum pump 630, which then may pass through cold trap 632 and flow meter 634 and into e.g., storage container 636.

In certain implementations, hydrogen generation chamber 110 may include a plurality of discrete chambers. Accordingly, hollow cylindrical anode 600 may include a plurality of hollow cylindrical anodes 606 configured to contain feedstock 114 and cathode 602 may include plurality of cathodes 608 may be positioned within plurality of hollow cylindrical anodes 606. Specifically, hydrogen generation chamber 110 may be configure so as to include multiple anode/cathode pair, thus increasing the production of hydrogen 112.

General:

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

A number of implementations have been described. Having thus described the disclosure of the present application in detail and by reference to embodiments thereof, it will be apparent that modifications and variations are possible without departing from the scope of the disclosure defined in the appended claims.

What is claimed is:

1. A hydrogen generation system comprising:
    a signal generation system configured to generate a driver signal;
    a signal processing system configured to process the driver signal and generate a chamber excitation signal; and
    a hydrogen generation chamber configured to receive the chamber excitation signal and generate hydrogen from a feedstock contained within the hydrogen generation chamber;
    wherein the signal processing system includes a feedback circuit that is configured to couple a cathode of the hydrogen generation chamber to an anode of the hydrogen generation chamber, the feedback circuit including
        a capacitive component including two discrete capacitors, and
        an asymmetrically conductive component positioned between the two discrete capacitors.

2. The hydrogen generation system of claim 1 wherein the capacitive component is sized based, at least in part, upon one or more physical characteristics of the hydrogen generation chamber.

3. The hydrogen generation system of claim 1 wherein the capacitive component is sized based, at least in part, upon one or more physical characteristics of the feedstock contained within the hydrogen generation chamber.

4. The hydrogen generation system of claim 1 wherein a first of the discrete capacitors is coupled to the anode of the hydrogen generation chamber.

5. The hydrogen generation system of claim 4 wherein a second of the discrete capacitors is coupled to the cathode of the hydrogen generation chamber.

6. The hydrogen generation system of claim 1 wherein the asymmetrically conductive component is a diode.

7. The hydrogen generation system of claim 6 wherein the diode is a light emitting diode.

8. The hydrogen generation system of claim 1 wherein the feedback circuit includes an asymmetrically conductive component.

* * * * *